(12) United States Patent
Sakai

(10) Patent No.: US 11,512,801 B2
(45) Date of Patent: Nov. 29, 2022

(54) PIPE JOINT AND METHOD OF ASSEMBLING PIPE JOINT

(71) Applicant: WATERWORKS TECHNOLOGY DEVELOPMENT ORGANIZATION CO., LTD., Osaka (JP)

(72) Inventor: Daisuke Sakai, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 325 days.

(21) Appl. No.: 16/759,031

(22) PCT Filed: Aug. 1, 2018

(86) PCT No.: PCT/JP2018/028844
§ 371 (c)(1),
(2) Date: Apr. 24, 2020

(87) PCT Pub. No.: WO2019/082466
PCT Pub. Date: May 2, 2019

(65) Prior Publication Data
US 2020/0278061 A1  Sep. 3, 2020

(30) Foreign Application Priority Data

Oct. 25, 2017  (JP) .............................. JP2017-206170

(51) Int. Cl.
*F16L 21/08* (2006.01)
*F16L 21/04* (2006.01)
*F16L 23/032* (2006.01)

(52) U.S. Cl.
CPC .............. *F16L 21/04* (2013.01); *F16L 21/08* (2013.01); *F16L 23/032* (2013.01)

(58) Field of Classification Search
CPC . F16L 17/02; F16L 21/04; F16L 21/08; F16L 23/032; F16L 27/12; F16L 27/125; F16L 27/053
(Continued)

(56) References Cited

U.S. PATENT DOCUMENTS 1,556,745 A    10/1925  Banta
4,524,505 A *  6/1985  Conner .................... F16L 21/08
                                                    285/321
2013/0076027 A1  3/2013  Maenishi et al.

FOREIGN PATENT DOCUMENTS

CN    1991228 A    7/2007
GB    1319596 A    6/1973
(Continued)

OTHER PUBLICATIONS

Translation JP2008-309276 (Year: 2008).*
(Continued)

*Primary Examiner* — Aaron M Dunwoody
(74) *Attorney, Agent, or Firm* — Dilworth & Barrese, LLP

(57) ABSTRACT

A pipe joint is configured such that an inserting pipe portion is inserted along a pipe axis direction to a receiving pipe portion having a flange portion to be connected thereto. The pipe joint includes a protruding portion having an integral construction, the protruding portion being fixed to an outer circumferential face of the inserting pipe portion and protruding radially outwards therefrom, a stopper member having an annular integral construction, the stopper member coming into contact with a first lateral face of the protruding portion to restrict displacement of the inserting pipe portion in a direction away from the receiving pipe portion, a fastening member configured to fasten the flange portion to the stopper member. A restricting face is formed in a second lateral face of the protruding portion disposed on an opposite
(Continued)

side to the first lateral face in the pipe axis direction, the restricting face restricting displacement of the inserting pipe portion in a direction for its insertion to the receiving pipe portion.

9 Claims, 7 Drawing Sheets

(58) Field of Classification Search
USPC .................................................. 285/113, 233
See application file for complete search history.

(56) References Cited

FOREIGN PATENT DOCUMENTS

| JP | S39-13266 Y1 | 5/1964 |
| JP | H9-250668 A | 9/1997 |
| JP | H10-311467 A | 11/1998 |
| JP | 2003-14174 A | 1/2003 |
| JP | 2003-106485 A | 4/2003 |
| JP | 2008-309276 | * 12/2008 |
| JP | 2008-309276 A | 12/2008 |
| JP | 2011-174493 A | 9/2011 |
| JP | 2011-256931 A | 12/2011 |
| JP | 2015-143524 | * 8/2015 |
| JP | 2015-143524 A | 8/2015 |
| JP | 2017-180472 A | 10/2017 |

OTHER PUBLICATIONS

Translation JP2015143524 (Year: 2015).*
Chinese Office Action from Chinese Patent Application No. 201880062024.6 dated Apr. 23, 2021.
Translation of the International Preliminary Report on Patentability from PCT/JP2018/028844 and Notification of Transmittal dated May 7, 2020.
The Decision of Refusal from Japanese Application No. 2019-549859 dated Aug. 30, 2022.

* cited by examiner

PIPE JOINT AND METHOD OF ASSEMBLING PIPE JOINT

TECHNICAL FIELD

This disclosure relates to a pipe joint for use in joining e.g. a water pipe and relates also to a method of assembling such pipe joint.

BACKGROUND ART

Conventionally, there is known a pipe joint having a flexible pipe made of cast iron acting as a receiving pipe portion and a stainless steel pipe acting as an inserting pipe portion, the inserting pipe portion being inserted into the receiving pipe portion to be connected thereto (e.g. see Patent Document 1 identified below). When an external force is applied to the pipe joint due to e.g. an earthquake, the flexibility of the flexible pipe will result in concentration of a bending force or a tensile force and a compressive force in the direction of the pipe axis to the pipe joint.

In Patent Document 1, a protrusion or a recess is provided in the outer circumferential face of the inserting pipe portion, and a split-type locking member is engaged to this projection or recess. Further, a sloped face is provided on the outer circumferential side of this locking member, and a press ring placed in contact with this sloped face is bolt-fastened to a flange portion of the receiving pipe portion. With this arrangement, at time of application of an external force to the pipe joint due to an earthquake or the like, the locking member will be reduced in its diameter by the sloped face, thus restricting displacement of the inserting pipe portion relative to the receiving pipe portion.

CITATION LIST

Patent Literature

Patent Document 1: Japanese Unexamined Patent Application Publication No. 2015-143524

SUMMARY OF INVENTION

Technical Problem

However, since the locking member described in Patent Document 1 has a split-type construction, in the event of concentration of e.g. a bending force to the pipe joint, damage may readily occur at the joining portion of the locking member. As a result, positional error can occur between the separate (split) members of the locking member, thus leading to deterioration in the function as the pipe point at time of application of a significant external force due to an earthquake or the like, which in turn may lead to eventual removal of the inserting pipe portion from the receiving pipe portion.

On the other hand, Patent Document 1 discloses an alternative arrangement in which the locking member is configured as an integral construction and placed in contact with the opposite lateral face of the projection provided in the outer circumferential face of the inserting pipe portion to or away from the receiving pipe portion. However, in this case, when a compressive force is applied in the pipe axis direction, the receiving pipe portion will be displaced toward the side of the inserting pipe portion. As a result, as an end portion of the inserting pipe portion can into hard and strong contact with the receiving pipe portion, thus possibly inviting damage in the inserting pipe portion. The above document further discloses an arrangement of the end portion of the inserting pipe portion being coated with an insulating member. In this case, the application of the compressive force in the pipe axis direction can result in damage of the insulating member, which in turn may lead to development of corrosion via fluid such as e.g. water due to electrical contact between the pipes of the different kinds.

In view of the above-described state of the art, there are needs for a pipe joint that allows firm fixation between an inserting pipe portion and a receiving pipe portion and also for a method of assembling such pipe joint.

Solution to Problem

According to a characterizing feature of this disclosure, there is provided a pipe joint configured such that an inserting pipe portion is inserted along a pipe axis direction to a receiving pipe portion having a flange portion to be connected thereto, the pipe joint comprising: a protruding portion having an integral construction, the protruding portion being fixed to an outer circumferential face of the inserting pipe portion and protruding radially outwards from the inserting pipe portion; a stopper member having an annular integral construction, the stopper member coming into contact with a first lateral face of the protruding portion to restrict displacement of the inserting pipe portion in a direction away from the receiving pipe portion; and a fastening member configured to fasten the flange portion to the stopper member; and wherein a restricting face is formed in a second lateral face of the protruding portion disposed on an opposite side to the first lateral face in the pipe axis direction, the restricting face restricting displacement of the inserting pipe portion in a direction for its insertion to the receiving pipe portion.

With the inventive arrangement described above, an integral protruding portion is fixed to the outer circumferential face of the inserting pipe portion and there is provided an integral annular stopper member configured to come into contact with the first lateral face of the protruding portion in such a manner as to restrict displacement of the inserting pipe portion away from the receiving pipe portion. Namely, thanks to the high rigidity of the protruding portion and the stopper member both of which have the integral construction, even in the event of application of a significant external force due to an earthquake or the like, damage will hardly occur in the protruding portion or the stopper member, whereby inadvertent removal of the inserting pipe portion from the receiving pipe portion can be prevented in a reliable manner.

Moreover, since a restricting face is formed in the second lateral face of the protruding portion for restricting displacement of the inserting pipe portion in the direction for its insertion to the receiving pipe portion, displacement of the receiving pipe portion toward the inserting pipe portion can also be prevented in the event of application of a compressive force in the pipe axis direction. With these, an appropriate spacing can be maintained in a reliable manner between the end portion of the inserting pipe portion and the interior face of the receiving pipe portion, so that corrosion due to accidental electric contact can be avoided even when the two pipe portions are formed as different kinds of pipe.

As described above, with such simple arrangement providing a protruding portion and a stopper member both of which have integral construction, there has been achieved a pipe joint that allows firm fixation between an inserting pipe portion and a receiving pipe portion.

According to a further characterizing feature, the pipe joint further comprises: an annular member having an integral construction, disposed between the flange portion and the stopper member; wherein the fastening member fastens the flange portion, the annular member and the stopper member together to each other, the displacement of the inserting pipe portion in the insertion direction to the receiving pipe portion being restricted via contact established between the restricting face and the annular member.

In the above-described arrangement, the restricting face of the protruding portion is placed in contact with the integral annular member which is fastened by the fastening member together with the flange portion and the stopper member. Namely, as the annular member having high rigidness is placed in contact with the restricting face of the protruding portion also having high rigidity, displacement of the receiving pipe portion toward the inserting pipe portion can be reliably prevented even in the event of application of a compressive force in the pipe axis direction.

According to a still further characterizing feature, the protruding portion comprises a C-shaped ring member fitted within an annular recess defined in the outer circumferential face of the inserting pipe portion.

With the above-described arrangement of the protruding portion being comprised of a C-shaped ring member and this C-shaped ring member being fitted within an annular recess defined in the outer circumferential face of the receiving pipe portion, assembly can be facilitated.

According to a still further characterizing feature, the protruding portion comprises an annular protrusion formed on and protruding integrally from the outer circumferential face of the inserting pipe portion.

With the above-described arrangement of the protruding portion being comprised of an annular protrusion protruding integrally from the outer circumferential face of the inserting pipe portion, thanks to the high rigidity of the annular protrusion, the inserting pipe portion and the receiving pipe portion can be firmly fixed to each other.

According to a still further characterizing feature, the protruding portion comprises an annular ring welded to the outer circumferential face of the inserting pipe portion.

With the above-described arrangement of the protruding portion being comprised of an annular ring welded to the outer circumferential face of the inserting pipe portion, there is no need for working a receded portion or a protruding portion in the outer circumferential face of the inserting pipe portion. Thus, the manufacture cost can be reduced.

According to a characterizing feature of a method of this disclosure, there is provided a method of assembling a pipe joint in which an inserting pipe portion is inserted along a pipe axis direction to a receiving pipe portion having a flange portion to be connected thereto, the method comprising: a first step of inserting a C-shaped ring member under its diameter-increased state along an outer circumferential face of the inserting pipe portion for engaging the ring member within an annular recess defined in the outer circumferential face; a second step of inserting an annular integral stopper member from a side of a first end portion of the inserting pipe portion for bringing the stopper member into contact with a first lateral face of the ring member; a third step of inserting an annular integral member from a side of a second end portion of the inserting pipe portion opposite to the first end portion for bringing the annular member into contact with the stopper member; and a fourth step of inserting the second end portion of the inserting pipe portion to the receiving pipe portion and fastening the flange portion, the annular member and the stopper member together to each other by a fastening member; wherein displacement of the inserting pipe portion in a direction for its insertion to the receiving pipe portion is restricted by establishment of contact between the annular member and a second lateral face of the ring member opposite to the first lateral face.

With the above-described method, a C-shaped ring member is brought into engagement with the annular recess defined in the outer circumferential face of the inserting pipe portion. An annular integral stopper member is inserted from the side of a first end portion of the inserting pipe portion to be brought into contact with a first lateral face of the ring member. An integral annular member is inserted from the side of the second end portion of the inserting pipe portion opposite to the first end portion to be brought into contact with the stopper member. And, these members, i.e. the flange portion, the annular member and the stopper member are fastened together to each other. Thus, the method of assembly of the pipe joint is easy and simple.

Further, the ring member and the stopper member both being integral act to restrict displacement of the inserting pipe portion in the direction of its removal from the receiving pipe portion (to the side of the first end portion), and the ring member and the stopper member act also to restrict displacement of the inserting pipe portion in the direction of its insertion to the receiving pipe portion (to the side of the second end portion). With these, even in the event of application of a significant external force due to e.g. an earthquake or the like, damage will hardly occur in the integral ring member, annular member and stopper member, so that an appropriate spacing may be maintained reliably between the end portion of the inserting pipe portion and the receiving pipe portion.

DESCRIPTION OF EMBODIMENTS

Next, embodiments of a pipe joint relating to the present disclosure will be explained with reference to the accompanying drawings. In this embodiment, as an example of the pipe joint, there will be explained a pipe joint 3 that constitutes a part of a flexible pipe unit Y provided in a fluid pipe 1 such as a water pipe or the like. It is understood however that the invention is not limited to the following embodiments, but various modifications will be possible within a range not departing from the essence of the invention.

Figure 1:
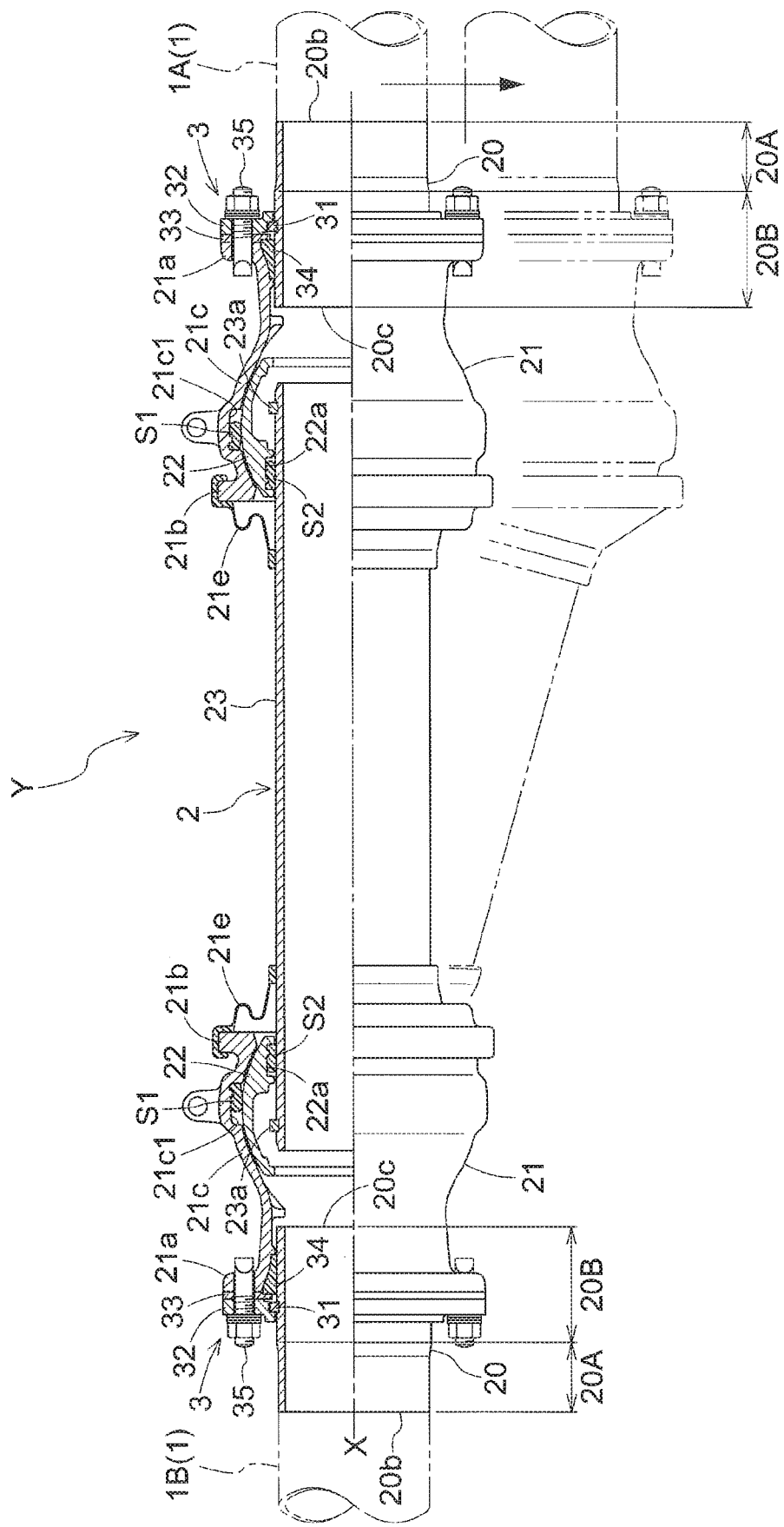
FIG. 1 is a semi-sectional side view showing a flexible pipe unit having a pipe joint relating to a first embodiment.

FIG. 1 shows a flexible pipe unit Y. This flexible pipe unit Y is to be fixed at such portion in a fluid piping system as a portion where a water main pipe 1A and a pipe 1B disposed in a building or the like are to be connected to each other, or a portion where the water main pipe 1A and a pipe 1B such as a water pipe bridge or the like installed over a river are to be connected to each other. In case a significant external force occurs due to an earthquake or the like, as indicated by two-dot chain lines in FIG. 1, the flexible pipe unit Y will receive a bending force, a tensile force, a compressive force resulting therefrom, thus preventing damage in the pipes of the fluid piping system.

The flexible pipe unit Y includes an inserting pipe portion 20 to which a water main pipe 1A and a pipe 1B formed of material such as stainless steel or the like are to be connected, a flexible pipe 2 having a receiving pipe portion 21 to which the inserting pipe portion 20 is to be inserted in a pipe axis direction X, and a pipe joint 3 for joining the inserting pipe portion 20 and the receiving pipe portion 21 to each other.

The inserting pipe portion 20 is a cylindrical member formed of such material as stainless steel or the like and defines, along the entire circumference of its outer circumferential face, an annular recess 20a in which a ring member 31 to be described later will be fitted/engaged (see FIG. 2). To a first end portion 20b of the inserting pipe portion 20 opposite to the side of the receiving pipe portion 21, the water main pipe 1A or the pipe 1B will be fixed by e.g. welding. Further, a second end portion 20c of the inserting pipe portion 20 of the receiving pipe portion 21 side (the side opposite to the first end portion 20b) is to be inserted into the receiving pipe portion 21 along the pipe axis direction X.

The flexible pipe 2 is a tubular member formed of such material as ductile cast iron, etc. and includes the receiving pipe portion 21, a rotatable hollow spherical body 22 provided inside the receiving pipe portion 21 and a straight pipe 23 provided inside the hollow spherical body 22. In the case of a same diameter (nominal diameter), the outside diameter of the flexible pipe 2 formed of ductile cast iron will be greater than the outside diameter of the water main pipe 1A or the pipe 1B formed of stainless steel. For instance, for a nominal diameter of 150 mm, the outside diameter of the flexible pipe 2 will be 169 mm and the outside diameter of the water main pipe 1A or the pipe 1B will be 165.2 mm. For a nominal diameter of 350 mm, the outside diameter of the flexible pipe 2 will be 374 mm and the outside diameter of the water main pipe 1A or the pipe 1B will be 355.6 mm. For this reason, in the outside diameter of the inserting pipe portion 20, a first area 20A thereof not covered by the receiving pipe portion 21 and in which the first end portion 20b is to be connected to the water main pipe 1A or the pipe 1B is formed smaller than a second area 20B thereof placed in opposition to the receiving pipe portion 21 of the flexible pipe 2, whereby a sloped stepped portion 20e is formed in the vicinity of the border between the first area 20A and the second area 20B (see FIGS. 1 and 2). This stepped portion 20e and the first area 20A are formed by cutting parts of the inserting pipe portion 20 formed with a same uniform outer diameter. Incidentally, in place of the sloped stepped portion 20e, a stepped-down portion may be provided. Thus, the shape of the stepped portion 20e is not particularly limited.

The receiving pipe portion 21 includes a first flange 21a (an example of "flange portion") protruding in an annular form on the radial outer side at the inserting pipe portion 20 side end portion and a second flange 21b protruding in an annular form on the radial outer side at the opposite end portion. In the second flange 21b side pipe body of the receiving pipe portion 21, there is formed a spherical face portion 21c bulging in an arcuate form on the radial outer side. In an annular groove 21c1 defined in the inner circumferential face of this spherical face portion 21c, a first seal member S1 is provided to seal between the receiving pipe portion 21 and the hollow spherical body 22. And, between and across the second flange 21b and the outer circumferential face of the straight pipe 23, a dust cover 21e is fixed for preventing intrusion of foreign object or substance.

At a portion of the hollow spherical body 22 contacting the straight pipe 23, an annular groove 22a is defined. And, a second seal member S2 is provided in this annular groove 22a, thus sealing between the hollow spherical body 22 and the straight pipe 23. At opposed end portions of the straight pipe 23, lock rings 23a are provided for preventing detachment of the receiving pipe portion 21 and the hollow spherical body 22 from the straight pipe 23, respectively.

First Embodiment

Figure 2:
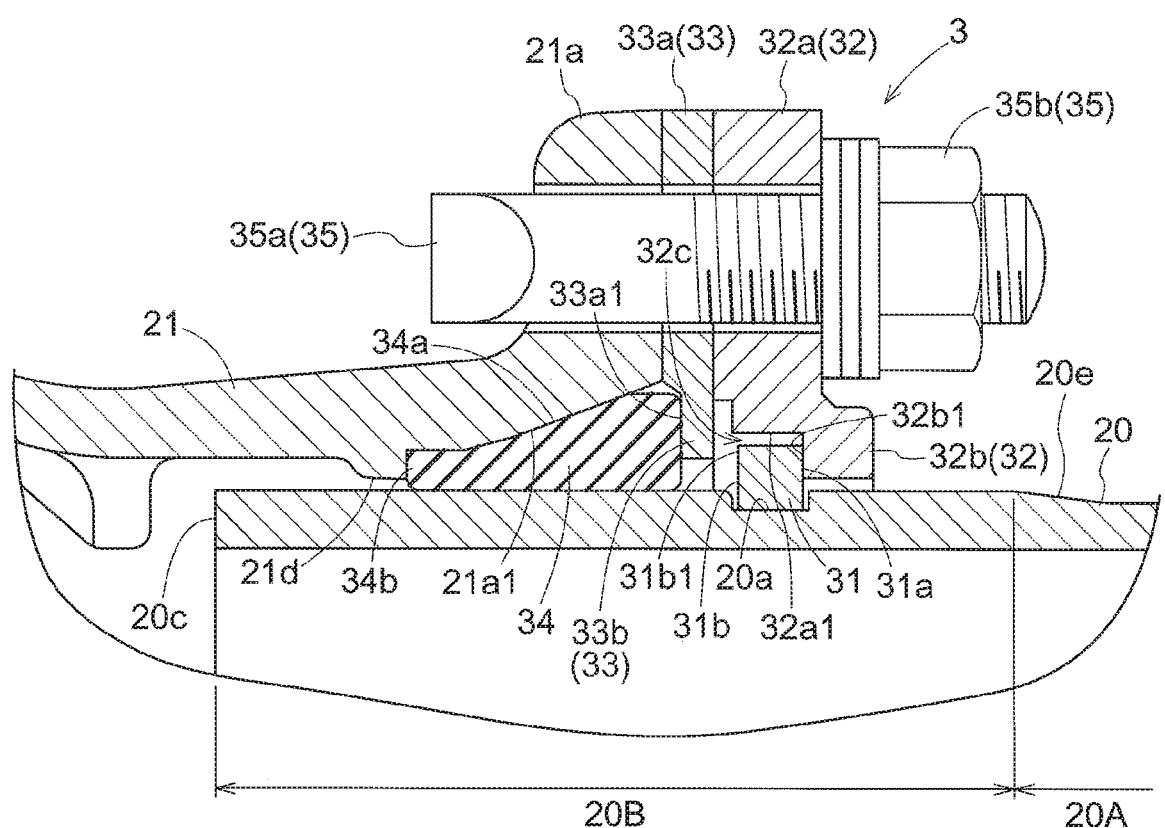
FIG. 2 is an enlarged sectional view showing the pipe joint relating to the first embodiment.
Figure 3:
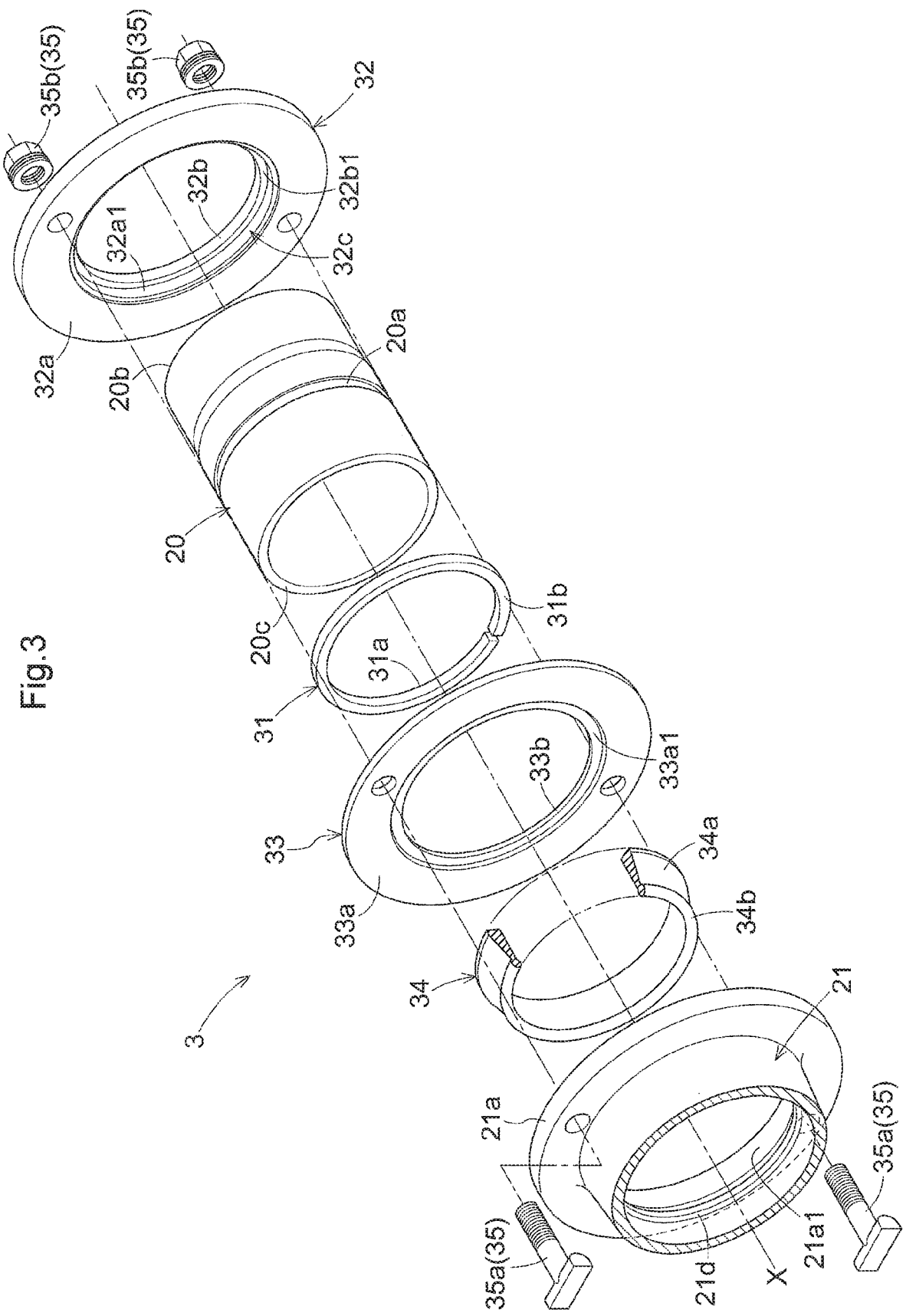
FIG. 3 is a view illustrating an assembling method of the pipe joint relating to the first embodiment.

As shown in FIGS. 2 and 3, the pipe joint 3 includes a C-shaped ring member 31 (an example of a "protruding portion") having an integral construction, an annular integral stopper member 32 to be placed in contact with a first lateral face 31a of the ring member 31, an integral press ring 33 (an example of an "annular member") disposed between the first flange 21a and the stopper member 32, a rubber ring 34 disposed between the inserting pipe portion 20 and the receiving pipe portion 21 to be pressed by the press ring 33, and a fastening member 35 for fastening the first flange 21a, the press ring 33 and the stopper member 32 together to each other.

The ring member 31 is a C-shaped ring formed of such material as stainless steel or the like and is fixed to the outer circumferential face of the inserting pipe portion 20 to protrude to the radial outer side therefrom. Specifically, this ring member 31 is fitted/engaged within the annular recess 20a defined in the outer circumferential face of the inserting pipe portion 20.

The stopper member 32 is formed of such material as ductile cast iron or the like and its surface is covered with an insulating material such as nylon coating or the like. The stopper member 32 includes an annular body portion 32a and a stepped portion 32b extending to protrude in the pipe axis direction X from one end of the annular body portion 32a. An annular space 32c formed of an inner face 32b1 of this stepped portion 32b and an end face 32a1 of the annular body portion 32a accommodates the ring member 31, with the inner face 32b1 of the stepped portion 32b being placed in contact with the first lateral face 31a of the ring member 31.

The press ring 33 is formed of such material as ductile cast iron or the like and its surface is coated with an insulating material such as nylon coating or the like. The press ring 33 includes an annular flat plate portion 33a to be bound between the first flange 21a and the stopper member 32 and a pressing portion 33b for pressing the rubber ring 34. In the pressing portion 33b, there is formed a stepped portion 33a1 which is formed thinner than the annular flat plate portion 33a and in which one end of the rubber ring 34 is to be fitted. In the instant embodiment, between the pressing portion 33b and the ring member 31, a gap or spacing is formed. So that, in association with a movement of the inserting pipe portion 20 in the direction of its insertion to the receiving pipe portion 21 (the approaching direction), a second lateral face 31b of the ring member 31 opposite to the first lateral face 31a will come into contact with the pressing portion 33b. More particularly, in the second lateral face 31b of the ring member 31, there is formed a restricting face 31b1 for restricting displacement of the inserting pipe portion 20 in the direction of its insertion to the receiving pipe portion 21, this restricting face 31b1 being able to come into contact with the press ring 33.

The rubber ring 34 includes a sloped portion 34a having a face parallel with a sloped face 21a1 formed in the inner circumferential face of the first flange 21a and a spherical portion 34b formed at the leading end side of the inserting direction of the inserting pipe portion 20 and coming into contact with the annular protrusion 21d formed on the inner circumferential face of the receiving pipe portion 21. When the inserting pipe portion 20 is inserted to the receiving pipe portion 21, the sloped portion 34a of the rubber ring 34 is compressed and also the spherical portion 34b is compressed more largely than the sloped portion 34a, thus providing sealing between the inserting pipe portion 20 and the receiving pipe portion 21.

The fastening member 35 is comprised of known insulating bolts 35a and insulating nuts 35b with outer faces thereof being coated with resin. And, a plurality of such bolts and nuts are disposed in distribution along the circumferential direction. In the instant embodiment, the insulating bolt 35a is formed as a T-shaped bolt, and in association with turning of the insulating nut 35b, the first flange 21a, the press ring 33 and the stopper member 32 will be drawn closer to each other and fastened together.

Next, with reference to FIG. 3, a method of assembling the pipe joint 3 will be explained.

Firstly, the C-shaped ring member 31 under its diameter-increased state will be inserted along the outer circumferential face of the inserting pipe portion 20 and the ring member 31 will be engaged within the annular recess 20a defined in the outer circumferential face of the inserting pipe portion 20 (first step). Next, the annular integral stopper member 32 will be inserted from the first end portion 20b side of the inserting pipe portion 20 to be brought into contact with the first lateral face 31a of the ring member 31 (second step). Incidentally, in case the first end portion 20b of the inserting pipe portion 20 is to be fixed by e.g. welding to the water main pipe 1A or the pipe 1B prior to assembling of the pipe joint 3, the order of the first step and the second step will be reversed. Namely, after welding-fixing the first end portion 20b of the inserting pipe portion 20 to the water main pipe 1A or the like, the annular integral stopper member 32 will be inserted from the second end portion 20c side of the inserting pipe portion 20. Subsequently, the C-shaped ring member 31 under its diameter-increased state will be inserted from the second end portion 20c side of the inserting pipe portion 20 and the ring member 31 will be fitted within the annular recess 20a and the stopper member 32 will be brought into contact with the first lateral face 31a of the ring member 31.

Next, the integral press ring 33 will be inserted from the second end portion 20c side of the inserting pipe portion 20 to be brought into contact with the stopper member 32 (third step). Then, the second end portion 20c of the inserting pipe portion 20 will be inserted to the receiving pipe portion 21 such that the rubber ring 34 may be located between the outer circumferential face of the inserting pipe portion 20 and the inner circumferential face of the receiving pipe portion 21 and the first flange 21a, the press ring 33 and the stopper member 32 will be fastened together to each other (fourth step). In this way, with the above-described arrangement of the ring member 31 being fitted in the annular recess 20a defined in the outer circumferential face of the inserting pipe portion 20 and the stopper member 32 and the press ring 33 being inserted one after another and fastened by the fastening member 35, the assembling can be carried out extremely easily.

Further, in the instant embodiment, the ring member 31 having an integral construction is fixed to the outer circumferential face of the inserting pipe portion 20 and there is provided the annular integral stopper member 32 that comes into contact with the first lateral face 31a of the ring member 31 so as to restrict displacement of the inserting pipe portion 20 in the direction departing from the receiving pipe portion 21. Namely, since the ring member 31 and the stopper member 32 both have high rigidity, even when a significant external force is applied due to an earthquake or the like, damage will hardly occur in the ring member 31 or the stopper member 32, so that inadvertent removal of the inserting pipe portion 20 from the receiving pipe portion 21 can be prevented reliably. Moreover, as the integral ring member 31 is fitted/engaged in the annular recess 20a, when the inserting pipe portion 20 tries to detach from the receiving pipe portion 21, floating displacement of the ring member 31 can be prevented. Furthermore, since the integral stopper member 32 and the integral ring member 31 come into face contact with each other, damage in the ring member 31 and the stopper member 32 can be prevented in this regard also.

Further, since the restricting face 31b1 for restricting displacement of the inserting pipe portion 20 in the direction of its insertion to the receiving pipe portion 21 is formed in the second lateral face 31b of the protruding portion having the integral construction, in the event also of application of a compressive force in the pipe axis direction X, displacement of the receiving pipe portion 21 toward the inserting pipe portion 20 can be prevented. With this, it becomes possible to maintain an appropriate spacing between the second end portion 20c of the inserting pipe portion 20 and the inner face of the receiving pipe portion 21, so that corrosion due to electric contact can be avoided even when the both pipe portions 20, 21 are formed as different types of pipe.

Next, further embodiments of the pipe joint 3 will be explained only in the respects thereof different from the foregoing embodiment. It is noted that same terms and signs will be used to represent same members in the following explanation for the sake of readiness of understanding of drawings.

Second Embodiment

Figure 4:
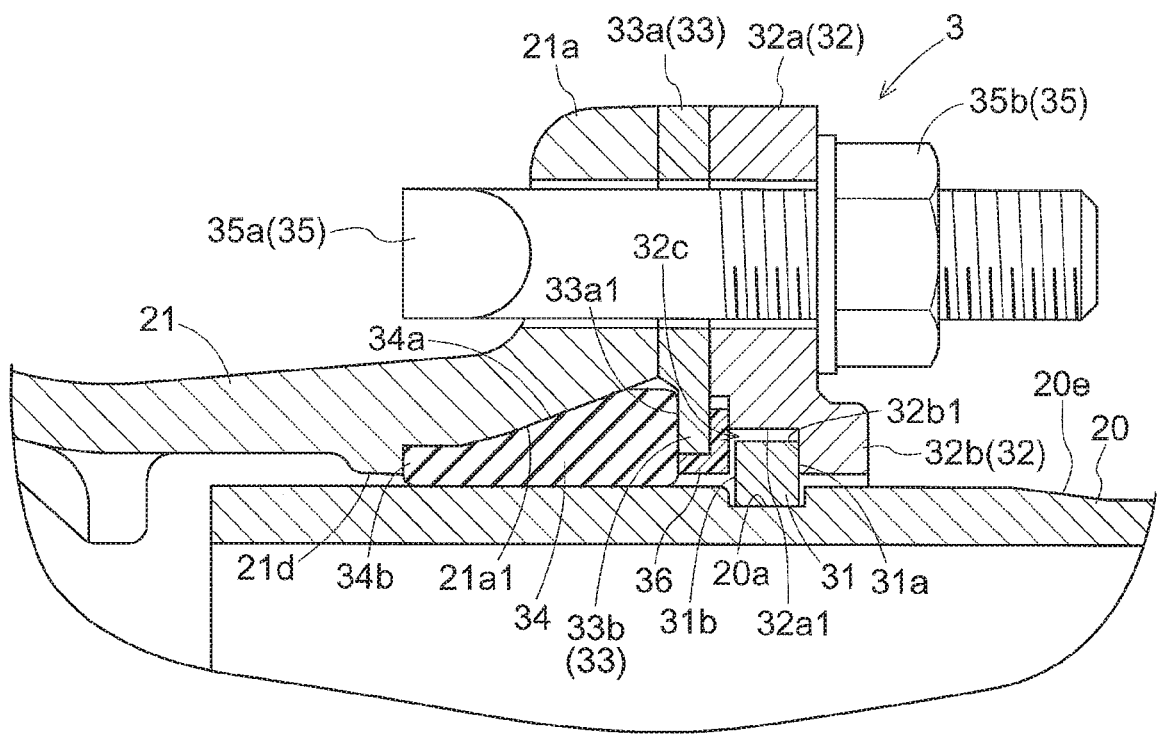
FIG. 4 is an enlarged sectional view showing a pipe joint relating to a second embodiment, FIG. 5 an enlarged sectional view showing a pipe joint relating to a third embodiment, FIG. 6 an enlarged sectional view showing a pipe joint relating to a fourth embodiment, FIG. 7 an enlarged sectional view showing a pipe joint relating to a fifth embodiment, FIG. 8 an enlarged sectional view showing a pipe joint relating to a sixth embodiment, and FIG. 9 an enlarged sectional view showing a pipe joint relating to a seventh embodiment.

As shown in FIG. 4, an insulating protective material 36 formed of rubber, resin, etc. may be provided in the spacing formed between the pressing portion 33b of the press ring 33 and the ring member 31. Such insulating protective material 36 may be fixed to the pressing portion 33b of the press ring 33 or may by fixed to the ring member 31. With this, the insulating coating of the press ring 33 can be omitted, so that further reduction will be made possible in the manufacture cost.

Third Embodiment

Figure 5:
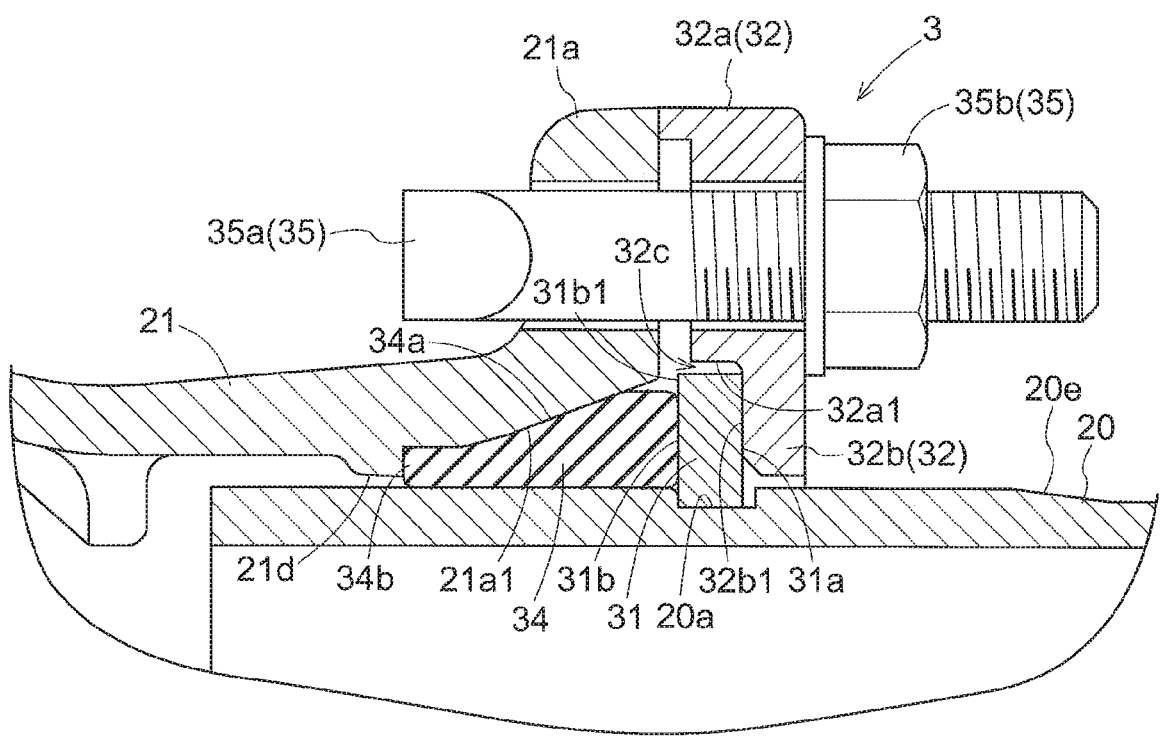

As shown in FIG. 5, by setting the ring member 31 higher than the first embodiment with omission of the press ring 33, an upper portion of the second lateral face 31b of the ring member 31 may be configured as the restricting face 31b1 which can come into contact with the first flange 21a. Also, a lower portion of the second lateral face 31b of the ring member 31 is used to press the rubber ring 34. With this, the press ring 33 can be omitted and also the third step in the first embodiment can also be omitted. Thus, operational efficiency can be enhanced, so that further reduction in the manufacture cost will be made possible.

Fourth Embodiment

Figure 6:
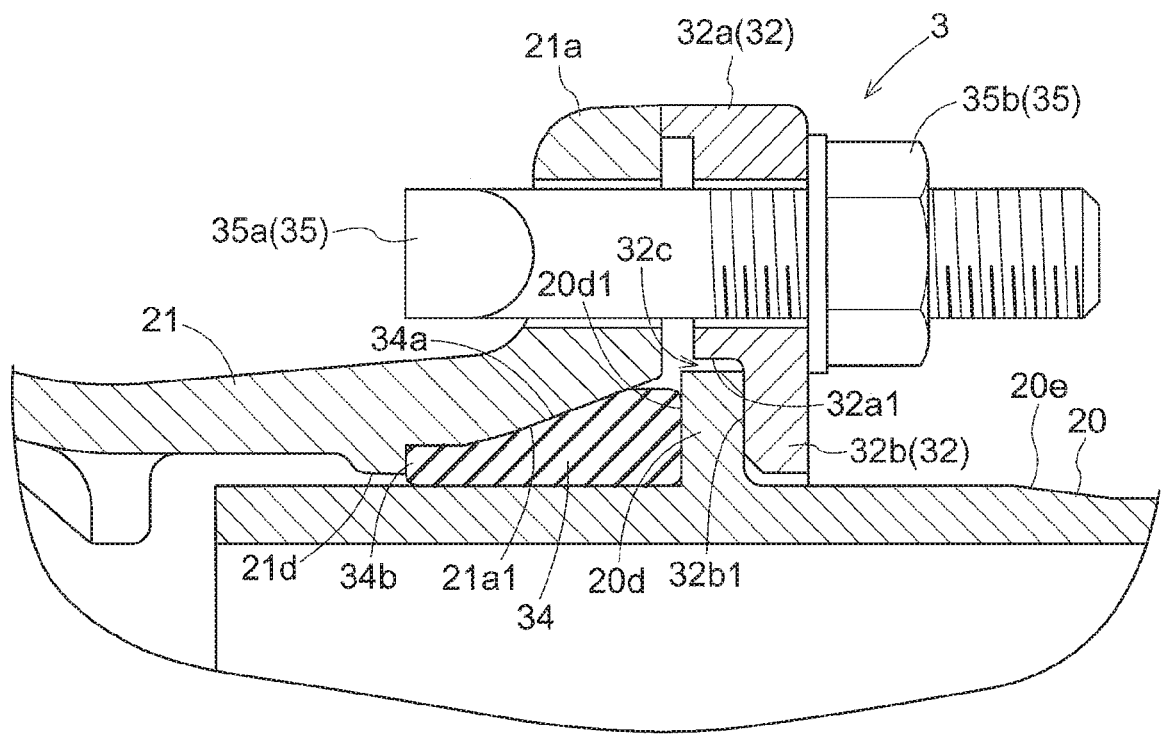

As shown in FIG. 6, as the integral protruding portion fixed to the outer circumferential face of the inserting pipe portion 20 and protruding to the radial outer side therefrom, an annular protrusion 20d may be caused to extend integrally from the outer circumferential face of the inserting pipe portion 20. In this embodiment, similarly to the third embodiment described above, the upper portion of the second lateral face 20d1 of the annular protrusion 20d is configured to be able to come into contact with the first flange 21a, and also the rubber ring 34 is pressed by the lower portion of the second lateral face 20d1 of the annular protrusion 20d. Since the integral annular protrusion 20d caused to extend integrally from the outer circumferential face of the inserting pipe portion 20 as provided in this embodiment has high rigidity, the inserting pipe portion 20 and the receiving pipe portion 21 can be fixed to each other firmly. Moreover, in the method of assembling the pipe joint 3 of this embodiment, the first step and the third step provided in the first embodiment can be omitted. Thus, the work efficiency can be increased and still further reduction of the manufacture cost will be made possible. Incidentally, the press ring 33 and the insulating protective material 36 may be provided, like the first embodiment and the second embodiment. The invention is not limited in this respect.

Fifth Embodiment

Figure 7:
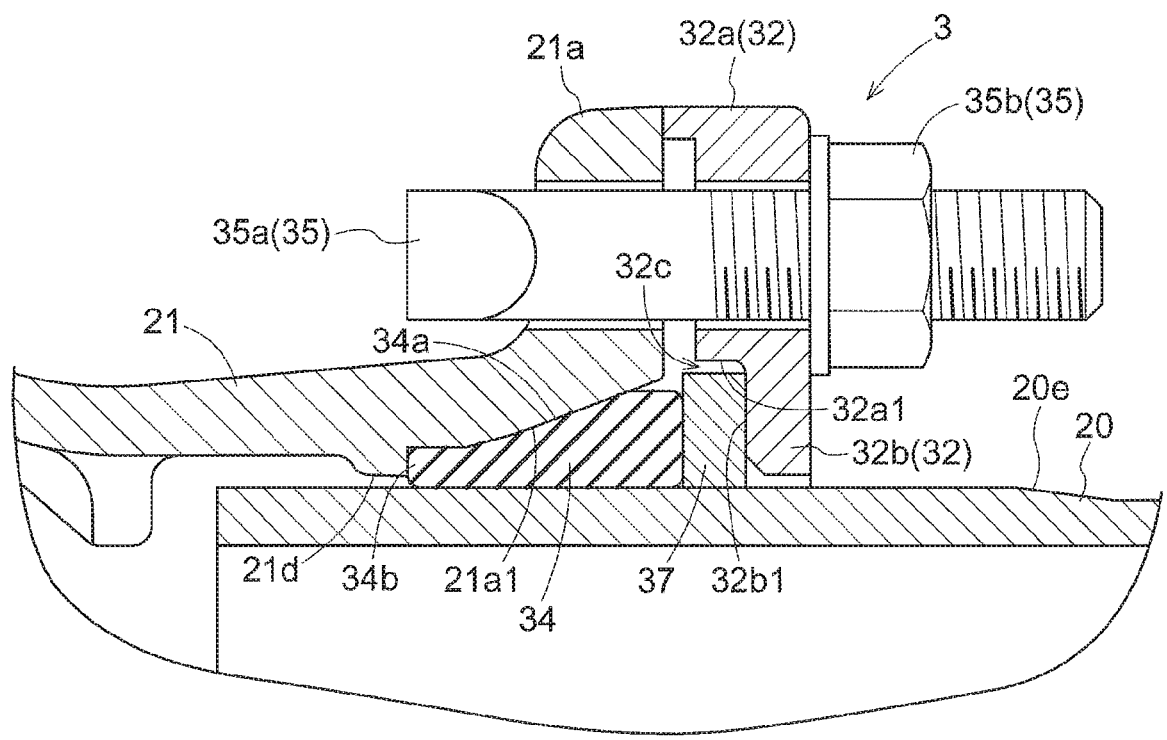

As shown in FIG. 7, in place of the annular protrusion 20d provided in the fourth embodiment, as an alternative integral protruding portion fixed to the outer circumferential face of the inserting pipe portion 20 and protruding to the radial outer side therefrom, there may be provided an annular ring 37 that is welded to the outer circumferential face of the inserting pipe portion 20. With forming such annular ring 37 welded to the outer circumferential face of the inserting pipe portion 20 as provided in this embodiment, there is no need for working any receded portion or protruding portion in/on the outer circumferential face of the inserting pipe portion 20, so the manufacture cost can be reduced. Moreover, in the case of the assembly method of this embodiment, the third step provided in the first embodiment can be omitted. So that, the work efficiency can be enhanced and further reduction in the manufacture cost will be made possible. Incidentally, the present invention is not limited to the above, since the press ring 33 or the insulating protective material 36 may be provided, like the first embodiment or the second embodiment.

Sixth Embodiment

Figure 8:
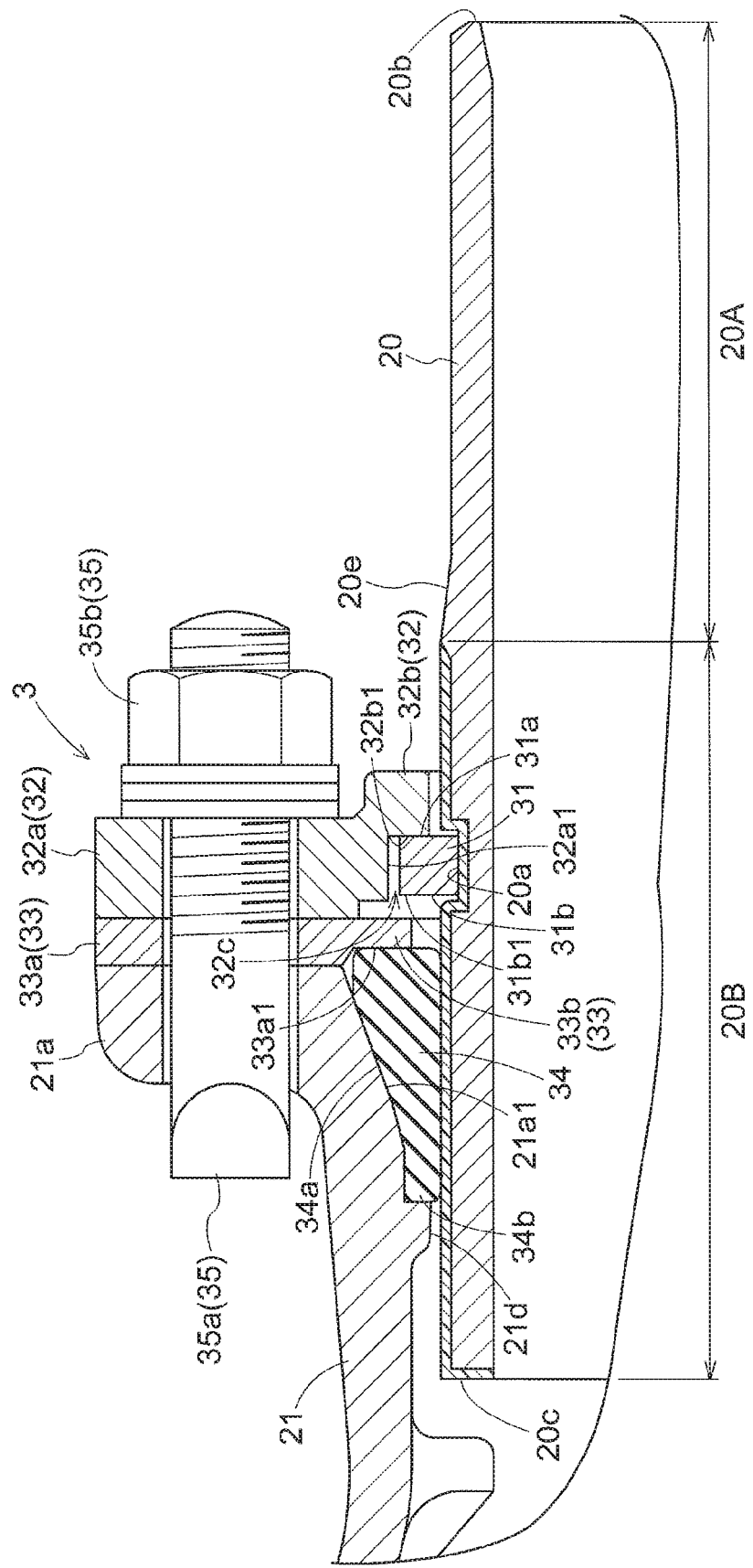

As shown in FIG. 8, in the pipe joint 3 in the first embodiment, of the inserting pipe portion 20 formed as a cylindrical member made of such material as stainless steel, the surface of the second area 20B (the outer circumferential face and the second end portion 20c) opposed to the receiving pipe portion 21 is coated with powdery material made from insulating material such as epoxy resin or the like. In this embodiment, even when there occurs electrical contact between the inserting pipe portion 20 and the receiving pipe portion 21, thanks to the insulating material coated on the surface of the second area 20B, corrosion of the both pipe portions 20, 21 can be effectively prevented.

Seventh Embodiment

As described above, for the nominal diameter of 150 mm, the outside diameter of the flexible pipe is 169 mm and the outside diameter of the water main pipe 1A or the pipe 1B is set to 165.2 mm. For the nominal diameter of 350 mm, the outside diameter of the flexible pipe is 374 mm and the outside diameter of the water main pipe 1A or the pipe 1B is set to 355.6 mm. Thus, the greater the nominal diameter, the greater the difference between the outside diameter of the flexible pipe 2 and the outside diameter of the water main pipe 1A or the pipe 1B. For this reason, when the difference between the outside diameter of the flexible pipe 2 and the outside diameter of the water main pipe 1A or the pipe 1B exceeds a predetermined value (e.g. 15 mm), in case the inserting pipe portion 20 is cut to form the stepped portion 20e, there will occur increase in the working cost and deterioration in the working efficiency also.

Figure 9:
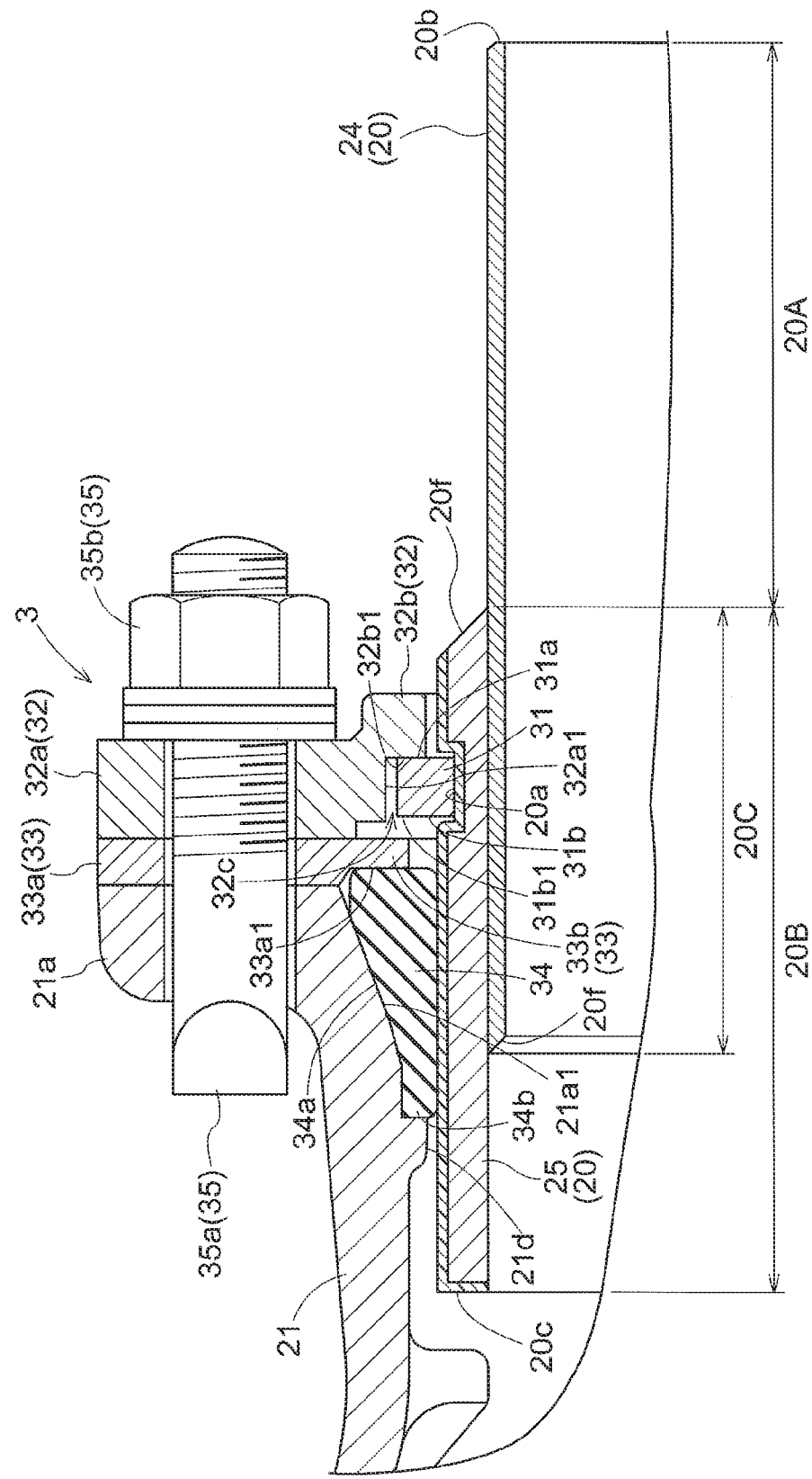

Then, in this embodiment, as shown in FIG. 9, in the pipe joint 3 of the first embodiment, the inserting pipe portion 20 is comprised of a first pipe portion 24 and a second pipe portion 25; and in the second area 20B of the inserting pipe portion 20 opposed to the receiving pipe portion 21, there is provided the second pipe portion 25 which increases the outside diameter of the inserting pipe portion 20. More particularly, the receiving pipe portion 21 side end portion of the inserting pipe portion 20 is comprised of a second end portion 20c of the second pipe portion 25 and the end portion of the inserting pipe portion 20 opposite to the receiving pipe portion 21 side is comprised of a first end portion 20b of the first pipe portion 24. The first pipe portion 24 and the second pipe portion 25 both are cylindrical members formed of such material as stainless steel and fixed to each other via e.g. welding. Further, at the end portion of the first pipe portion 24 opposite to the first end portion 20b and at the end portion of the second pipe portion 25 opposite to the second end portion 20c, there are formed sloped stepped portions 20f. Also, there is provided a radially overlapped portion 20C between the first pipe portion 24 and the second pipe portion 25, thus providing increased joining strength therebetween. The surface of the second pipe portion 25 (the outer circumferential face and the second end portion 20c) opposed to the receiving pipe portion 21 is painted with powdery material made from insulating material such as epoxy resin or the like. With these arrangements, in this embodiment, even when there occurs electrical contact between the inserting pipe portion 20 (second pipe portion 25) and the receiving pipe portion 21, thanks to the insulating material coated on the surface of the second pipe portion 25, corrosion of the both pipe portions 20, 21 can be effectively prevented. Moreover, since outer diameter difference between the first area 20A and the second area 20B of the inserting pipe portion 20 can be compensated for by simply providing the second pipe portion 25. Thus, the manufacture can be made easier than the case of cutting work carried out for forming the inserting pipe portion 20.

Other Embodiments (1) Instead of constituting the receiving pipe portion 21 in the foregoing embodiments as a part of the flexible pipe 2 having the hollow spherical body 22, this may be constituted as e.g. a flexible pipe having bellows-like construction, There is no limitation in this respect in the present invention.

(2) In addition to the arrangements of the foregoing embodiments, a further reinforcing member may be provided between the first flange 21a and the press ring 33 and/or between the press ring 33 and the ring member 31.

(3) In the foregoing embodiments, a spacing is formed between the pressing portion 33b the ring member 31. Instead, the pressing portion 33b and the ring member 31 can be placed in constant contact with each other.

(4) In the foregoing embodiments, as one example of the fluid pipe 1 constituting the fluid piping system, explanations were made with using a water pipe. However, the fluid pipe can be a pipe through which gas or any other liquid flows.

(5) The foregoing embodiments can be combined in any way. For instance, the arrangement of the sixth embodiment or the seventh embodiment may be applied to the arrangements of the second through fifth embodiments.

INDUSTRIAL APPLICABILITY

The present invention is applicable to a pipe joint for use in joining a water pipe or the like and also to an assembling method of such pipe joint.

REFERENCE SIGNS LIST

3: pipe joint
20: inserting pipe portion
20a: annular recess
20b: first end portion
20c: second end portion
20d: annular protrusion (protruding portion)
20d1: second lateral face
21: receiving pipe portion
21a: first flange (flange portion)
31: ring member (protruding portion)
31a: first lateral face
31b: second lateral face
31b1: restricting face
32: stopper member
33: press ring (annular member)
35: fastening member
37: annular ring (protruding portion)
X: pipe axis

The invention claimed is:
1. A pipe joint comprising:
an inserting pipe portion;
a receiving pipe portion to which the inserting pipe portion is inserted and connected along a pipe axis direction, the receiving pipe portion having a flange portion;
a protruding portion having an integral construction, the protruding portion being fixed to an outer circumferential face of the inserting pipe portion and protruding radially outwards from the inserting pipe portion;
a stopper member having an annular integral construction, the stopper member coming into contact with a first lateral face of the protruding portion to restrict displacement of the inserting pipe portion in a direction away from the receiving pipe portion;
an annular member having an integral construction, disposed between the flange portion and the stopper member; and a fastening member configured to fasten the flange portion, the annular member and the stopper member together to each other;
wherein the protruding portion is accommodated in an annular space formed on an inner of the stopper member, a restricting face is formed in a second lateral face of the protruding portion disposed on an opposite side to the first lateral face in the pipe axis direction, the restricting face restricting displacement of the inserting pipe portion in an insertion direction to the receiving pipe portion; and
the displacement of the inserting pipe portion in the insertion direction to the receiving pipe portion is restricted via contact established between the restricting face and the annular member.

2. The pipe joint of claim 1, additionally comprising an annular recess on an outer circumferential surface of the inserting pipe portion and configured to receive the protruding portion.

3. The pipe joint of claim 1, additionally comprising a rubber ring positioned on a side of the annular member opposite the stopper member, said annular member configured to press said rubber ring.

4. The pipe joint of claim 3, wherein said rubber ring has an outer circumferential surface sloped complementary to a sloped inner circumferential surface of said flange portion.

5. The pipe joint of claim 4, wherein said flange portion comprises an inner annular protrusion configured to contact an axial end of the rubber ring opposite the annular member.

6. The pipe joint of claim 1, wherein said stopper member, annular member, and flange portion comprise through-holes configured to align to receive the fastening member when assembled together.

7. The pipe joint of claim 6, wherein the fastening member is a nut-and-bolt.

8. The pipe joint of claim 1, wherein the protruding portion is additionally radially situated between the outer circumferential face of the inserting pipe portion and the stopper member.

9. A method of assembling a pipe joint in which an inserting pipe portion is inserted along a pipe axis direction to a receiving pipe portion having a flange portion to be connected thereto, the method comprising:
a first step of inserting a C-shaped ring member under its diameter-increased state along an outer circumferential face of the inserting pipe portion for engaging the ring member within an annular recess defined in the outer circumferential face;
a second step of inserting an annular integral stopper member from a side of a first end portion of the inserting pipe portion for bringing the stopper member into contact with a first lateral face of the ring member;
a third step of inserting an annular integral member from a side of a second end portion of the inserting pipe portion opposite to the first end portion for bringing the annular member into contact with the stopper member; and
a fourth step of inserting the second end portion of the inserting pipe portion to the receiving pipe portion and fastening the flange portion, the annular member and the stopper member together to each other by a fastening member;
wherein displacement of the inserting pipe portion in a direction for its insertion to the receiving pipe portion is restricted by establishment of contact between the annular member and a second lateral face of the ring member opposite to the first lateral face.

* * * * *